(No Model.)

T. HAND.
NUT LOCK.

No. 594,738. Patented Nov. 30, 1897.

WITNESSES:
Jos. A. Ryan
M. S. Blondel

INVENTOR
Townson Hand
BY Munn & Co.
ATTORNEYS.

UNITED STATES PATENT OFFICE.

TOWNSON HAND, OF NORTH VERNON, INDIANA, ASSIGNOR OF ONE-HALF TO OSCAR HAND, OF SHELBYVILLE, INDIANA.

NUT-LOCK.

SPECIFICATION forming part of Letters Patent No. 594,738, dated November 30, 1897.

Application filed June 28, 1897. Serial No. 642,674. (No model.)

*To all whom it may concern:*

Be it known that I, TOWNSON HAND, a citizen of the United States, residing at North Vernon, in the county of Jennings and State of Indiana, have invented certain new and useful Improvements in Nut-Locks, of which the following is a specification, reference being had to the accompanying drawings, forming part thereof, and in which—

Figure 1:
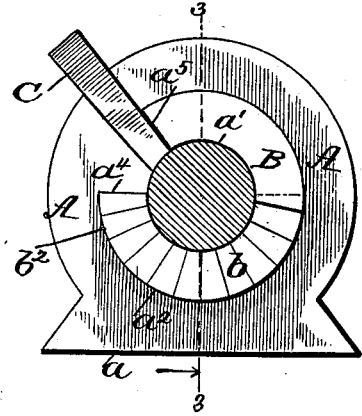
Figures 2, 3:
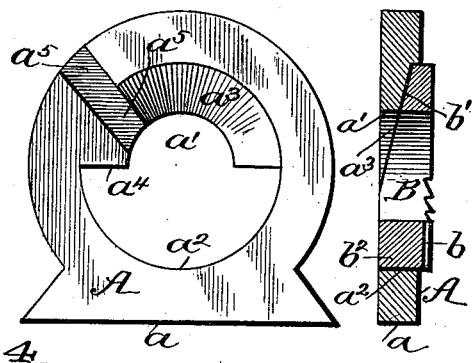
Figure 4:
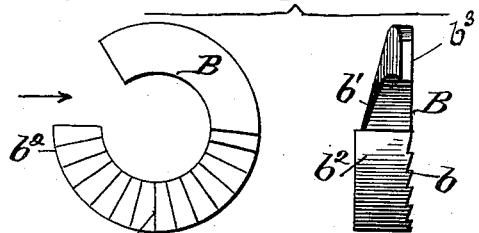
Figure 5:
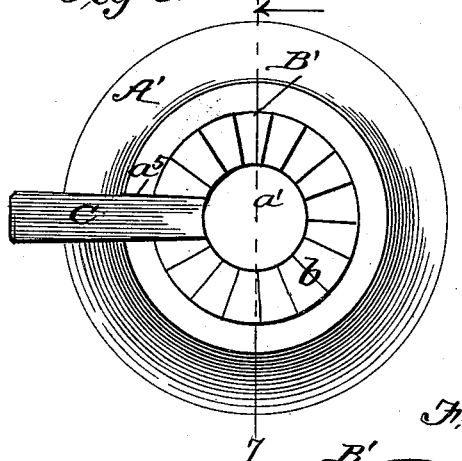
Figure 6:
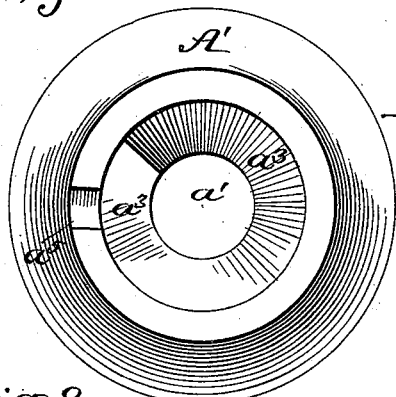
Figure 7:
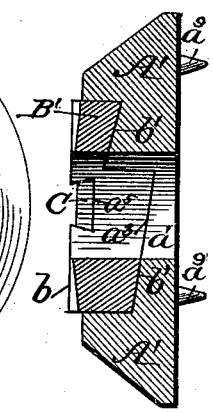
Figure 8:
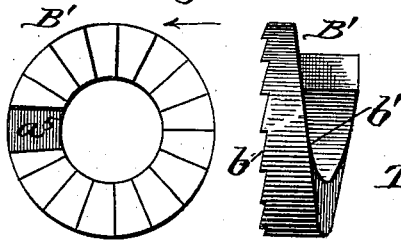

Figure 1 is a face view of my improved nut-lock. Fig. 2 is a similar view of the washer or stationary member thereof. Fig. 3 is a section on line 3 3, Fig. 1. Fig. 4 shows the movable part or nut-engaging cam in front and side elevation. Fig. 5 is a view similar to Fig. 1, but showing a different or modified construction. Fig. 6 is a face view of the washer or movable member thereof. Fig. 7 is a section on line 7 7 of Fig. 5. Fig. 8 shows the cam or movable member in front and side elevation.

My invention relates to devices for locking nuts against accidental or unauthorized removal from their bolts.

The object of the invention is to provide a nut-lock in which any attempt to unscrew the nut will cause a cam member of the lock to rotate and bind firmly against the nut.

The invention consists principally in a nut-lock comprising a fixed member having an inclined surface concentric with the bolt-opening and upon which rests the inclined inner face of an annular locking-cam adapted to rotate and ride up the incline on the fixed member and wedge firmly against the inner face of the nut whenever the nut is turned in a direction to unscrew it.

Referring to Figs. 1 to 3, the washer or stationary member A has a lower straight edge $a$ to rest on a rail, fish-plate, or other surface and prevent rotation. The washer A is provided at one side of the bolt-opening $a'$ with a semicircular opening $a^2$, which extends through it from face to face, and at the other side of the bolt-opening there is formed a semicircular cam-surface $a^3$, which surface begins at the rear face of the washer and gradually approaches the outer face of the washer, or, in other words, proceeds helically about the bolt-opening and terminates at the abrupt shoulder $a^4$. The outer face of the washer is provided with a groove $a^5$, which forms a keyway and intersects the inclined surface or cam $a^3$ adjacent to the shoulder $a^4$, for a purpose to be hereinafter described.

B is the movable member of the lock and is in the form of a broken ring or annulus. The front face of the locking member B is flat and provided with teeth $b$, which are inclined in the direction in which the nut turns while being screwed on a bolt. The annular member B is, moreover, thicker than the washer and of an even thickness where it fits in the opening $a^2$, but its rear side is formed with a cam-surface $b'$, inclined in an opposite direction to and bearing against the cam-surface $a^3$. The thick end $b^2$ of the annular member B normally rests against the shoulder $a^4$, and the thin end $b^3$ terminates at the keyway $a^5$. It will be seen, therefore, when the washer A and movable member B are in position on a bolt and the nut is screwed up tight against the toothed face $b$ that any attempt to rotate the nut in an opposite direction, or to the left, will rotate the member B and cause its inclined face $b'$ to ride up the incline $a^3$. This action will force the member B out against the adjacent face of the nut and absolutely prevent removal of the nut. The more force applied to the nut the greater the binding action of the locking member B. If, however, the operator will place a key C in the first instance in the keyway $a^5$ and thus prevent rotation of the member B the nut may be unscrewed; but in the absence of the key removal of the nut from the bolt is impossible. When the nut is being screwed on, the member B is held from rotation by the engagement of its thick end $b^2$ with the shoulder $a^4$.

Referring now to Figs. 5 to 7, the general arrangement is similar to that just described; but the stationary part or washer A' is circular and provided on its rear face with penetrating points $a^9$ to prevent turning. The opening $a^2$ is omitted, and the helical cam-surface $a^3$ proceeds entirely around the bolt-opening $a'$ or is circular instead of semicircular. Moreover, the highest or thickest part of the cam $a^3$ is slightly below or within the plane of the face of the washer or stationary part A'. The movable annular member B' is not broken and its under or rear face $b'$ corresponds to the cam-surface $a^3$ and acts just as in Figs. 1 to 3. The outer toothed face $b$ of the movable member is beyond the plane of the fixed member $A'$, so as to engage the nut when screwed onto the bolt. The keyway $a^5$ is extended across this toothed face, so that a key C may be employed, as before described, to hold the member $B'$ stationary when the nut is to be removed from the bolt.

It will be understood that the invention covers a construction in which the surface $a^3$ is formed not only on a washer, but in any place where there is a bolt-hole.

What I claim is—

1. A nut-lock consisting of the stationary member having an inclined surface concentric to the bolt-hole, and a rotary locking member, the outer face of which is adapted to be engaged by a nut and the inner face of which is inclined reversely to the stationary inclined surface to ride up the same and force said rotary member outwardly when the nut is turned to unscrew it, the stationary member being recessed in line with the said rotary member to receive means for preventing the revolution of the latter with respect to the nut, as set forth.

2. The combination with the stationary member recessed around its bolt-hole and provided concentric therewith with an inclined surface, of an annular locking member mounted to turn in said recess, said locking member having its inner face inclined reversely to the incline of the stationary member and its outer face toothed to engage the rear face of the nut, the stationary member being provided with a keyway adapted to receive a key to prevent said annular locking member from turning, as set forth.

3. A nut-lock consisting of a stationary member having a recess concentric to its bolt-hole, an inclined surface within said recess and terminating adjacent to the outer face of said member in a shoulder and the annular rotary member in said recess and having its inner face inclined to ride up the stationary incline, the outer face of said rotary member being adapted for engagement by a nut, there being provided a keyway adapted to receive a key to engage said rotary member to hold it stationary and permit the nut to be unscrewed, as set forth.

4. A nut-lock consisting of the stationary member having an inclined surface concentric to the bolt-hole, and a rotary locking member having its inner face inclined reversely to the incline of the stationary member and by which the said rotary member is forced outward into engagement with the nut when the latter is turned to unscrew it, the said members being provided with registering keyways adapted to receive a key to prevent said rotary member from turning, as set forth.

5. A nut-lock consisting of the stationary member provided with an opening extending therethrough from face to face and concentric to the bolt-hole, and an inclined surface concentric to said bolt-hole, said surface extending from the rear face of said member to the front face thereof, and a rotary locking member fitting in said opening and having a portion of its rear face beyond said opening inclined reversely to the incline of the stationary member, as set forth.

TOWNSON HAND.

Witnesses:
ALBERT E. YEAGER,
JOHN HAND.